United States Patent
Yao

(10) Patent No.: US 7,884,568 B2
(45) Date of Patent: Feb. 8, 2011

(54) PORTABLE ELECTRONIC DEVICE

(75) Inventor: Hsiao-Chang Yao, Hsinchu (TW)

(73) Assignee: Altek Corporation, Hsinchu (TW)

( * ) Notice: Subject to any disclaimer, the term of this patent is extended or adjusted under 35 U.S.C. 154(b) by 562 days.

(21) Appl. No.: 12/022,251

(22) Filed: Jan. 30, 2008

(65) Prior Publication Data
US 2009/0085513 A1   Apr. 2, 2009

(30) Foreign Application Priority Data
Sep. 28, 2007   (TW) ............................. 96136346 A

(51) Int. Cl.
*H02J 7/00* (2006.01)
*H01M 10/44* (2006.01)
*H01M 10/46* (2006.01)

(52) U.S. Cl. .................. 320/101; 320/112; 320/114; 396/270; 396/304

(58) Field of Classification Search ................ 320/101, 320/112, 114; 396/270, 304
See application file for complete search history.

(56) References Cited

U.S. PATENT DOCUMENTS

| | | | |
|---|---|---|---|
| 4,328,456 A * | 5/1982 | Suzuki et al. | 320/101 |
| 4,823,241 A * | 4/1989 | Trattner | 362/183 |
| 6,707,274 B1 * | 3/2004 | Karr | 320/107 |
| 2002/0067425 A1 * | 6/2002 | Iverson | 348/373 |
| 2005/0253552 A1 * | 11/2005 | Wu | 320/101 |

FOREIGN PATENT DOCUMENTS

| | | | |
|---|---|---|---|
| JP | 07181577 A | * | 7/1995 |
| JP | 2003008958 A | * | 1/2003 |

* cited by examiner

*Primary Examiner*—Edward Tso
*Assistant Examiner*—Samuel Berhanu
(74) *Attorney, Agent, or Firm*—Alan Kamrath; Kamrath & Associates PA

(57) ABSTRACT

A portable electronic device comprises a main body, a lens module and a solar panel. The main body comprises a battery pack and a photosensitive element. The lens module is connected with the main body. The solar panel is disposed between the photosensitive element and the lens module, and the solar panel is electrically connected with the battery pack. The solar panel is able to receive the light focused by the lens module and convert the light into electricity to supply to the battery pack.

12 Claims, 2 Drawing Sheets

PORTABLE ELECTRONIC DEVICE

BACKGROUND OF THE INVENTION

1. Field of the Invention

The present invention relates to a portable electronic device and, more particularly, to a portable electronic device capable of being charged by solar power and being applied to any electronic device having a lens module.

2. Description of the Related Art

With technologies development, various portable electronic devices have been introduced into our daily life and work, such as digital cameras, mobile phones or PDAs...etc. These portable electronic devices mainly use its own battery module for power supply; therefore, it is necessary to pay attention to remain battery power. However, if the battery power is low in an emergency occasion or long time usage period, and there is no extra battery module available, this portable electronic device will shut down and cause inconvenience.

In order to solve the above-mentioned problem, some portable electronic devices capable of using solar power are developed. In Taiwan patent publish No. M241861, title "power supply device for a digital image information apparatus" disclosures a digital image information apparatus capable of being charged by solar power, which has a solar battery element on the surface of the digital image information apparatus. However, most technologies of prior arts place the solar panel on the surface of the electronic device or externally connect the solar panel to the portable electronic device. Since the solar panel requires large area, which increases the volume of the portable electronic device, and the electronic device might not be portable anymore.

It is therefore desirable to provide a portable electronic device capable of being charged by solar power to mitigate and/or obviate the aforementioned problems.

SUMMARY OF THE INVENTION

A main objective of the present invention is to provide to a portable electronic device capable of being charged by solar power and being applied to any electronic device having a lens module.

In order to achieve the above-mentioned objective, a portable electronic device of the present invention comprises a main body, a lens module and a solar panel. The main body comprises a battery pack and a photosensitive element. The lens module is connected with the main body. The solar panel is disposed between the photosensitive element and the lens module, and the solar panel is electrically connected with the battery pack. The solar panel is able to receive the light focused by the lens module and convert the light into electricity to supply to the battery pack. Therefore, the user can charge the portable electronic device with solar light while the portable electronic device is not in-use, to prevent power shortage.

The solar panel of the portable electronic device is moveable. By changing the position of the solar panel, the light collected by the lens module can be controlled to inject to the solar panel or the photosensitive element, for the solar power charging process or the image capturing process.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
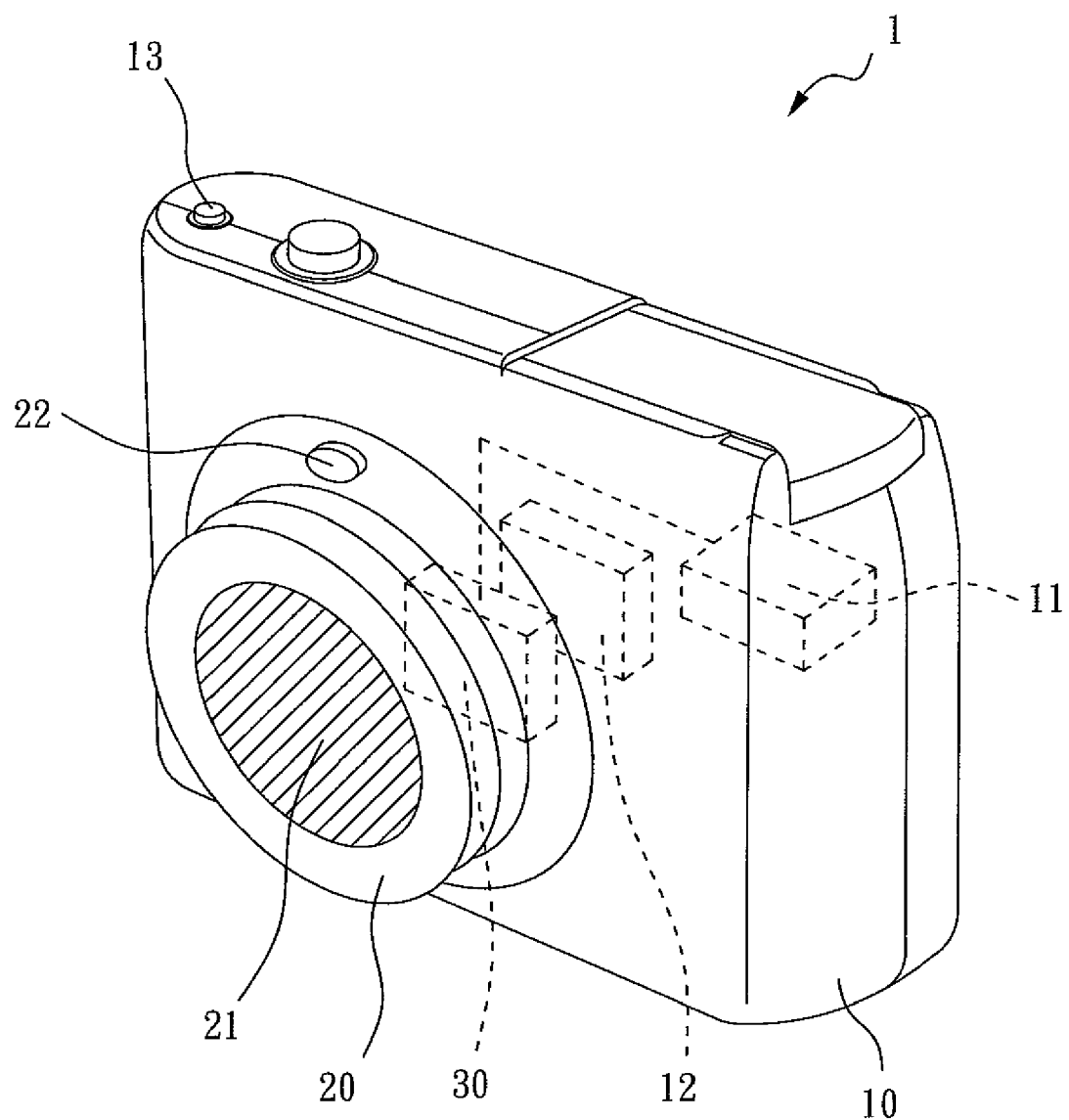
FIG. 1 is a schematic drawing of a portable electronic device of the present invention.

Please refer to FIG. 1. FIG. 1 is a schematic drawing of a portable electronic device of the present invention. As shown in FIG. 1, the portable electronic device 1 of the present invention comprises a main body 10, a lens module 20 and a solar panel 30. The main body 10 comprises a battery pack 11 and a photosensitive element 12. The lens module 20 is connected to the main body 10. The solar panel 30 is disposed between the photosensitive element 12 and the lens module 20, and the solar panel 30 is electrically connected to the battery pack 11. The solar panel 30 receives the light collected by the lens module 20 and converts the light into electricity to supply to the battery pack 11. Furthermore, a distance between the lens module 20 and the solar panel 30 is about equal to a focal length of the lens module 20. With the above-mentioned design, a user can place the lens module 20 of the portable electronic device 1 under sunlight so the sunlight can be collected by the lens module 20 injects onto the solar panel 30. The lens module 20 can focus more light, it can increase the light energy received by the solar panel 30 to improve the energy conversion efficiency of the solar panel 30 to generate more electric power for the battery pack 11. Moreover, since the energy conversion efficiency of the solar panel 30 is improved, the size of the solar panel 30 of the portable electronic device 1 can be reduced. Furthermore, since the solar panel 30 is disposed in the main body 10 not on the portable electronic device 1, the volume of the portable electronic device 1 can also be reduced. In this embodiment, the portable electronic device 1 is a digital camera but it can also be other electronic devices with the lens module 20, such as mobile phones or PDAs.

Figure 2:
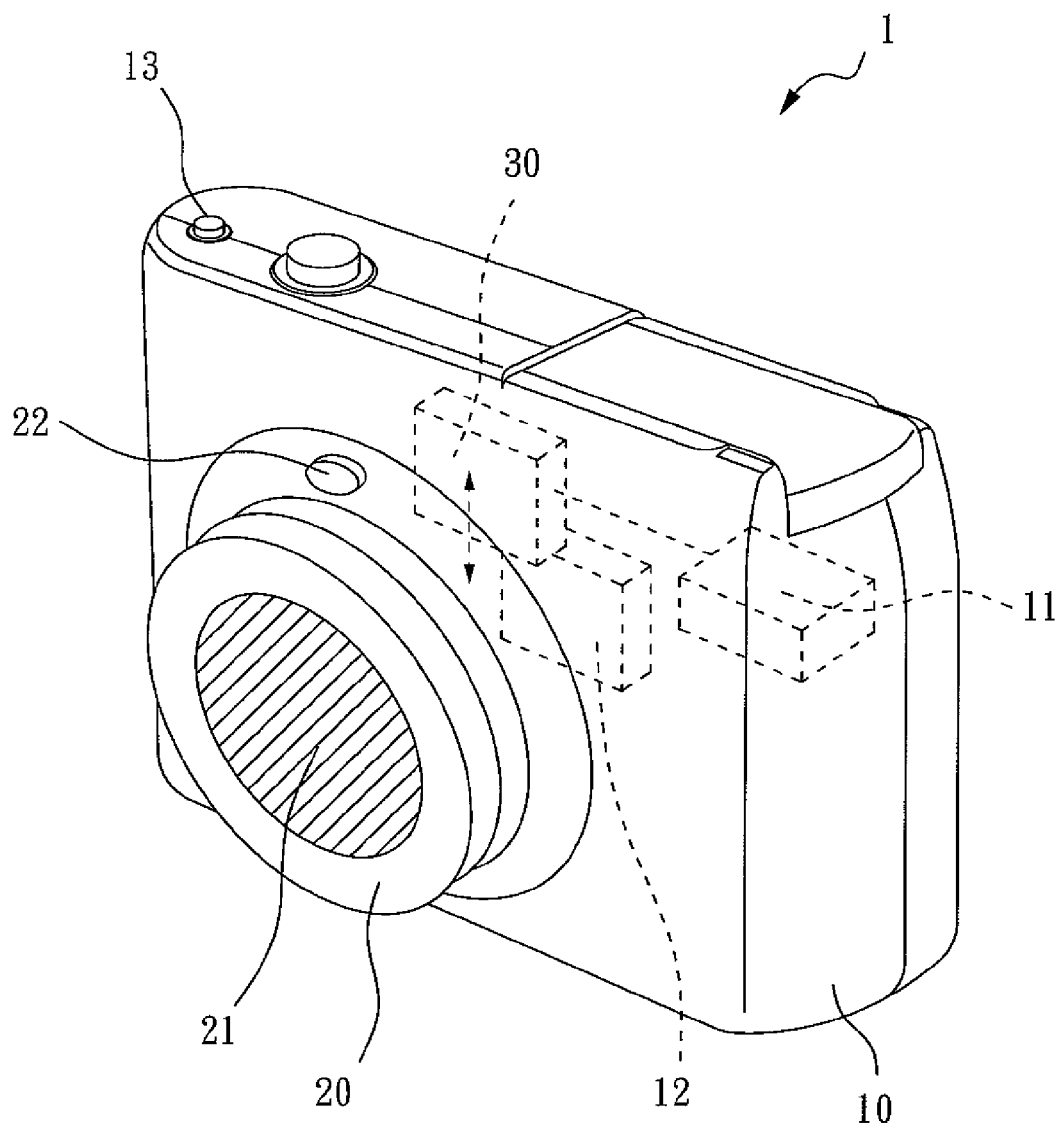
FIG. 2 is a movement schematic drawing of a solar panel of the portable electronic device according to the present invention.

Please refer to FIG. 2. FIG. 2 is a movement schematic drawing of a solar panel of the portable electronic device according to the present invention. As shown in FIG. 2, the solar panel 30 of the portable electronic device 1 is moveable. In this embodiment, the main body 10 comprises a switch 13 for adjusting the position of the solar panel 30. For the initial status, the solar panel 30 is overlapped in front of the photosensitive element 12. When the portable electronic device 1 is used for capturing images, by turning on the switch 13, the solar panel 30 is moved so the photosensitive element 12 can directly receives the light collected by the lens module 20, and the solar panel 30 is not blocking the light. Similarly, in order to perform the solar power charging process to the portable electronic device 1, the switch 13 is turning on again so the solar panel 30 moves back to the original position and receives lights for the charging process.

As shown in FIG. 1 and FIG. 2, the lens module 20 of the portable electronic device 1 comprises a cover 21, the cover 21 is used for protecting the lens in the lens module 20 from dusts or damage while the portable electronic device 1 is not in-use. In this embodiment, the lens module 20 comprises a control button 22, for controlling the movement of the cover 21. In general, the cover 21 can be design as a manual operation (for a digital single-lens reflex camera) or for an automatic operation (for an automatic digital camera) base on different types of the portable electronic device 1. The power of the portable electronic device 1 having the automatic operated cover 21 needs to be turned on to automatically open the cover 21. With the present invention design, when the power of the portable electronic device 1 is turned off, the control button 22 is pressed to open the cover 21, to perform the solar power charging process to the portable electronic device 1; and when the charging process is finished, the control button 22 is pressed again to close the cover 21. Furthermore, the cover 21 can be designed as being controlled by the switch 13 of the main body 10, so the switch 13 and the cover 21 can be activated at the same time. With the present invention design, when the user wants to perform the solar power charging process to the portable electronic device 1, he or she needs to active the switch 13 to move the solar panel 30 to a position for receiving the solar light, and the cover 21 is also opened to let the solar light to be collected by the lens module 20 and injected onto the solar panel 30. When the solar power charging process is finished, the switch 13 needs to be activated again to move the solar panel 30 from the original position and close the cover 21. Moreover, the switch 13 and the control button 22 are not limited with the actual buttons shown in FIG. 1 and FIG. 2, the portable electronic device 1 can also be an electronic device with a LCD display, and the switch 13 and the control button 22 are virtual buttons shown on the display.

Furthermore, the photosensitive element 12 of the portable electronic device 1 may be combined with the solar panel 30. With semiconductor process technology, the photosensitive element 12 and the solar panel 30 may be integrated as one element which is photosensitive and capable of converting light into electric energy. Therefore, the total volume of the portable electronic device 1 can be reduced, and the manufacture cost can be reduced, too.

Although the present invention has been explained in relation to its preferred embodiment, it is to be understood that many other possible modifications and variations can be made without departing from the spirit and scope of the invention as hereinafter claimed.

What is claimed is:

1. A portable electronic device capable of being charged by solar power, the portable electronic device comprising:
   a main body comprising a battery pack and a photosensitive element;
   a lens module connected with the main body; and
   a solar panel disposed between the photosensitive element and the lens module, and the solar panel is electrically connected to the battery pack;
   wherein the solar panel receives light collected by the lens module and convert the light into electricity to supply to the battery pack.

2. The portable electronic device as claimed in claim 1, wherein the solar panel is movable.

3. The portable electronic device as claimed in claim 2 further comprises a switch which is used for adjusting the position of the solar panel.

4. The portable electronic device as claimed in claim 3, wherein the lens module includes a cover.

5. The portable electronic device as claimed in claim 4, wherein when the switch is pressed, the movement of the cover is also being controlled by the switch.

6. The portable electronic device as claimed in claim 1, wherein a distance between the lens module and the solar panel is about equal to a focal length of the lens module.

7. The portable electronic device as claimed in claim 1, wherein the lens module includes a cover.

8. The portable electronic device as claimed in claim 7 further comprises a control button for controlling the movement of the cover.

9. The portable electronic device as claimed in claim 1, wherein the photosensitive element can be integrated with the solar panel.

10. The portable electronic device as claimed in claim 1, wherein the portable electronic device is a digital camera.

11. The portable electronic device as claimed in claim 1, wherein the portable electronic device is a mobile phone.

12. The portable electronic device as claimed in claim 1, wherein the portable electronic device is a personal digital assistant.

* * * * *